US012748271B2

(12) United States Patent
Liang et al.

(10) Patent No.: US 12,748,271 B2
(45) Date of Patent: Sep. 29, 2026

(54) SILICON-BASED OPTICAL COMPONENT AND METHOD OF FORMING THE SAME

(71) Applicant: Taiwan Semiconductor Manufacturing Company, Ltd., Hsinchu (TW)

(72) Inventors: Shih-Wei Liang, Taichung City (TW); Chen-Hua Yu, Hsinchu City (TW); Jiun-Yi Wu, Taoyuan City (TW); Nien-Fang Wu, Chiayi City (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 498 days.

(21) Appl. No.: 18/333,102

(22) Filed: Jun. 12, 2023

(65) Prior Publication Data

US 2024/0411093 A1 Dec. 12, 2024

(51) Int. Cl.
*G02B 6/42* (2006.01)

(52) U.S. Cl.
CPC ......... *G02B 6/4214* (2013.01); *G02B 6/4207* (2013.01)

(58) Field of Classification Search
CPC ............................ G02B 6/4207; G02B 6/4214
See application file for complete search history.

(56) References Cited

U.S. PATENT DOCUMENTS

| | | | | |
|---|---|---|---|---|
| 9,377,594 | B2 * | 6/2016 | Liff | G02B 6/43 |
| 9,465,175 | B2 * | 10/2016 | Shi | G02B 5/04 |
| 11,644,618 | B2 * | 5/2023 | Bishop | G02B 6/4257 385/14 |
| 2004/0258354 | A1 * | 12/2004 | Sekiya | G02B 6/4292 385/35 |
| 2006/0067607 | A1 * | 3/2006 | Fang | G02B 6/4214 385/39 |
| 2012/0183009 | A1 * | 7/2012 | Adachi | G02B 6/4214 438/31 |
| 2016/0306110 | A1 * | 10/2016 | Lambert | G02B 6/125 |

* cited by examiner

*Primary Examiner* — Daniel Petkovsek
(74) *Attorney, Agent, or Firm* — McClure, Qualey & Rodack, LLP

(57) ABSTRACT

An optical component is provided. The optical component includes a silicon-based body including a bottom wall, a first side wall, a second side wall, and a micro lens structure. The first side wall is located on a first side of the silicon-based body and perpendicular to the bottom wall. The second side wall is located on a second side of the silicon-based body opposite to the first side, and forms an acute angle with the bottom wall. The micro lens structure is formed on the first side wall. The optical component further includes a protection layer formed over the first side wall and the micro lens structure.

20 Claims, 12 Drawing Sheets

SILICON-BASED OPTICAL COMPONENT AND METHOD OF FORMING THE SAME

BACKGROUND

Optical signaling and processing are typically combined with electrical signaling and processing to provide full-fledged applications. For example, optical fibers may be used for long-range signal transmission, and electrical signals may be used for short-range signal transmission, as well as for processing and control. Accordingly, devices that integrate optical components and electrical components are produced for the conversion between optical signals and electrical signals, as well as the processing of optical signals and electrical signals. Photonic Packages thus may include both optical (photonic) dies including optical devices and electronic dies including electronic devices.

A fiber array unit (FAU) consists of a one-dimensional or two-dimensional array of optical fibers, typically used to couple light from some light sources to the fibers, and from the fibers to waveguides within the optical die of a photonic package. Additionally, optical components (such as mirrors, lenses, or a combination thereof) can be disposed between the photonic package and the FAU to help guide the light.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
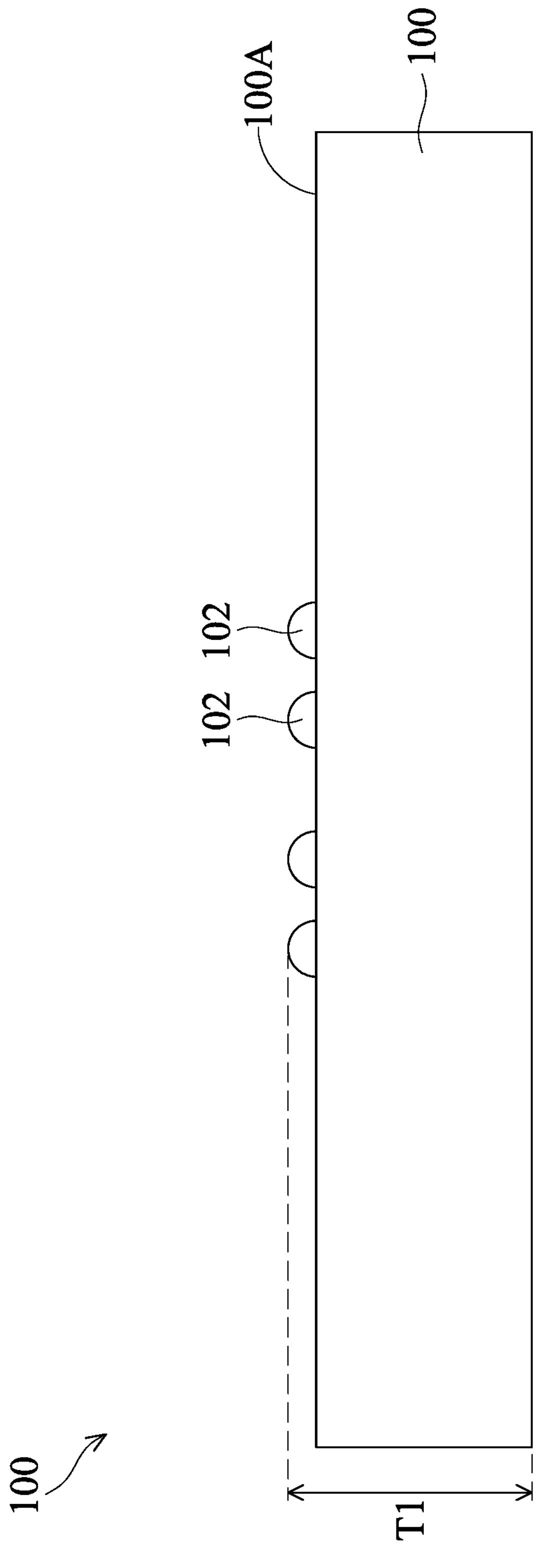
FIGS. 1A to 1H illustrate cross-sectional views of intermediate stages in the formation of silicon-based optical components, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

Silicon-based optical components and the method for forming the same are provided in accordance with some embodiments. In some cases, the silicon-based optical component acts as both a mirror and a lens, and can be integrated within a semiconductor package to help guide light from optical fibers in a fiber unit array (FAU) into a photonic package including a photonic die. In accordance with some embodiments, the silicon-based optical components are formed from a silicon substrate using semiconductor manufacturing techniques. This allows for the formation of smaller-sized and higher-precision optical components, and can reduce manufacturing costs. The Embodiments discussed herein provide examples to enable making or using the subject matter of this disclosure, and a person having ordinary skill in the art will readily understand that modifications can be made while remaining within the contemplated scope of different embodiments. Throughout the various views and illustrative embodiments, like reference numbers are used to designate like elements. Although method embodiments may be discussed as being performed in a particular order, other method embodiments may be performed in any logical order.

FIGS. 1A to 1H illustrate cross-sectional views of intermediate stages in the formation of silicon-based optical components 20 (hereinafter also referred as optical components 20), in accordance with some embodiments. In FIG. 1A, a semiconductor substrate 100 (hereinafter also referred as a substrate 100) is provided. The substrate 100 may be a bulk semiconductor or the like. In some embodiments, the substrate 100 is a wafer, such as a silicon wafer. The substrate 100 may have a thickness T1 of about 770 μm, as is known to those skilled in the art for the thickness of a silicon wafer.

The substrate 100 may then be patterned using acceptable photolithography and etching techniques to form micro lenses 102 on its top surface 100A, in accordance with some embodiments. For example, a hard mask layer (e.g., a nitride layer or the like, not shown) may be formed over the substrate 100 and patterned, with the pattern of the hard mask layer corresponding to the micro lenses 102, in some embodiments. In some embodiments, a reflow process is performed to shape the pattern of the hard mask layer into the desired spherical shape, before the etching processes. One or more etching processes may then be performed on the substrate 100 using the patterned hard mask layer as an etching mask to form the spherical micro lenses 102 by removing part of the material of the substrate 100. The etching processes may include one or more dry etching processes and/or wet etching processes, which may include an isotropic process. In some embodiments, after the micro lenses 102 are formed, the hard mask layer is removed using an ashing process or other suitable etching processes.

Figure 1B:
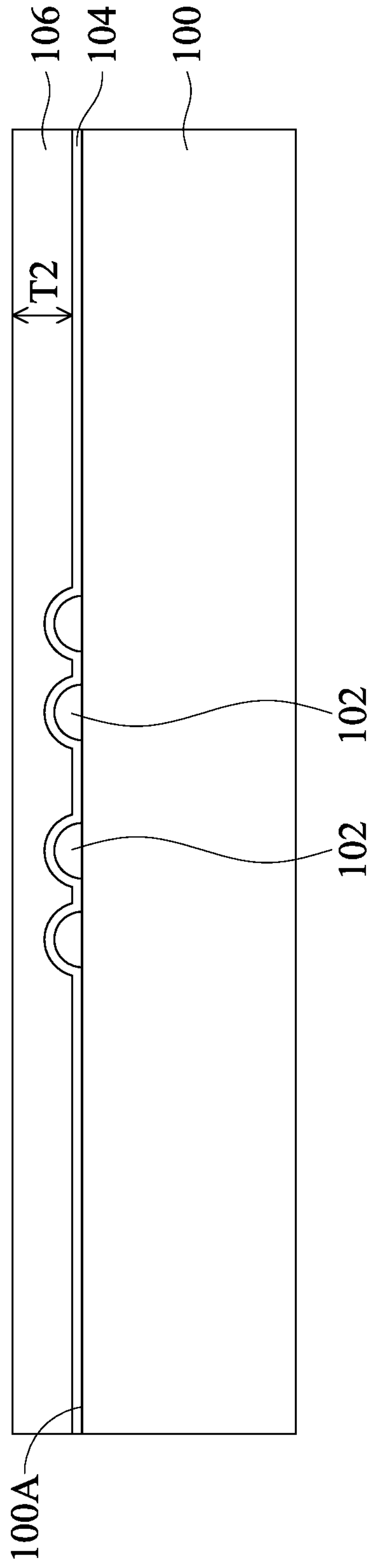
Figure 2:
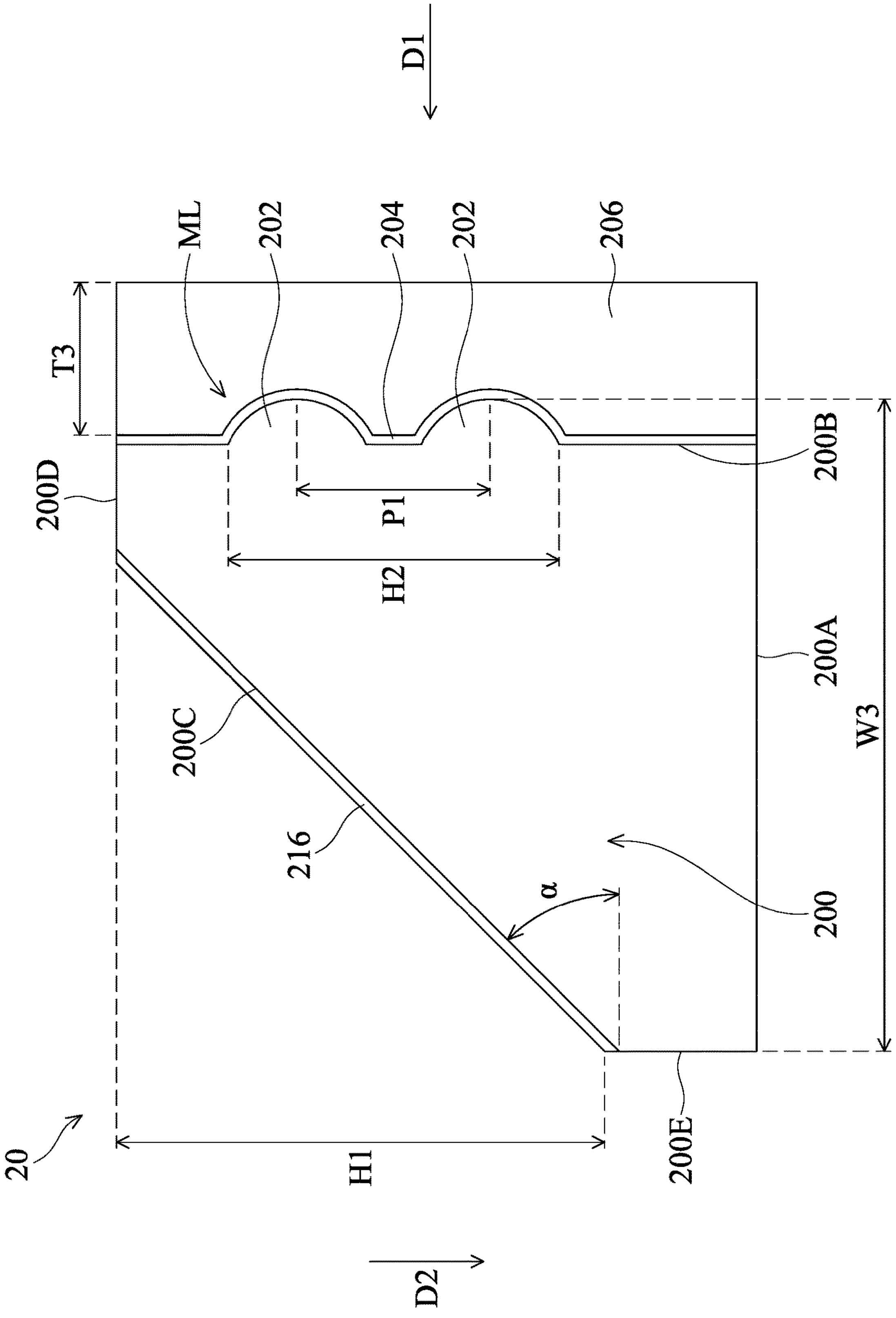
FIG. 2 illustrates a cross-sectional view of a silicon-based optical component, in accordance with some embodiments.

In FIG. 1B, an anti-reflection coating (ARC) 104 is conformally formed over the top surface 100A of the substrate 100 including the micro lenses 102, in accordance with some embodiments. The presence of the anti-reflection coating 104 is to reduce the light reflection occurring on the light incident surface of the silicon-based body (e.g., 200, as shown in FIG. 2) of the optical component 20, so as to improve the optical coupling efficiency of the optical component 20. The anti-reflection coating 104 may be a multi-layered (e.g., three-layered, not shown) structure, although fewer or more layers may be used. In some embodiments, the anti-reflection coating 104 may include a silicon oxide ($SiO_2$) layer, a hafnium oxide ($HfO_2$) layer over the silicon oxide layer, and a tantalum oxide ($Ta_2O_5$) layer over the hafnium oxide layer. These layers may each be formed to have a suitable thickness by any acceptable process, such as chemical vapor deposition (CVD), physical vapor deposition (PVD), atomic layer deposition (ALD), or other suitable deposition processes. Other suitable dielectric materials (e.g., titanium oxide ($TiO_2$), silicon nitride (SiN), amorphous silicon, or the like.), different layer configurations, and other formation techniques may be used in other embodiments. In some embodiments, the thickness of the anti-reflection coating 104 may be in a range between about 500 nm and about 1800 nm. Other thicknesses may be used in other embodiments.

An oxide (e.g., silicon oxide) layer 106 is formed over the anti-reflection coating 104, in accordance with some embodiments. The oxide layer 106 may be used to protect the underlying layers and/or structures, and hence may also be referred to as a protection layer 106. Additionally, due to the difference in refractive indices of the materials of the oxide layer 106 and the semiconductor substrate 100, the oxide layer 106 also helps refract light into the silicon-based body 200 (e.g., as shown in FIG. 2) to improve the optical coupling efficiency of the optical component 20. The oxide layer 106 may be formed by any acceptable process, such as CVD, PVD, ALD, plasma enhanced chemical vapor deposition (PECVD), or other suitable deposition processes. In other embodiments, other suitable oxide and/or dielectric materials (e.g., SiON, TaO, SiN) that allow the light from optical fibers to pass through, and other formation techniques may be used. The thickness T2 of the oxide layer 106 may be in a range between about 3 μm and about 5 μm, in some embodiments. Other thicknesses may be used in other embodiments.

In some embodiments, a planarization process (e.g., a chemical mechanical polishing (CMP) process or the like) may be performed to planarize the top surface (the upper surface shown) of the oxide layer 106, which facilitates the subsequent processes (such as the bonding process shown in FIG. 1C) and can improve the optical coupling efficiency of the optical component 20. The planarization process may also be omitted in some other embodiments if the top surface of the oxide layer 106 is already sufficiently planar.

Figure 1C:
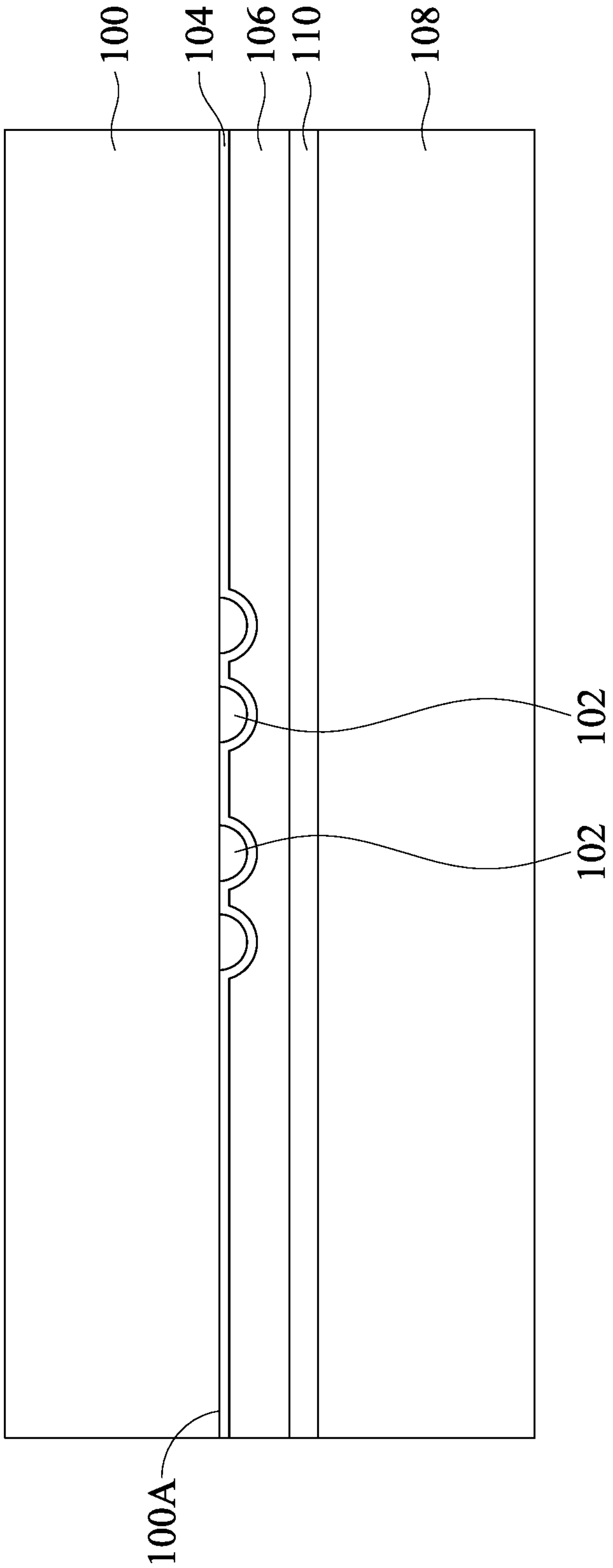

In FIG. 1C, the structure shown in FIG. 1B is flipped over and attached to a carrier 108, in accordance with some embodiments. The carrier 108 may be, for example, a wafer (e.g., a silicon wafer), a panel, a glass substrate, a ceramic substrate, or the like. The structure may be attached to the carrier 108 using, for example, a release film 110. The release film 110 may be formed of a polymer-based material and/or an epoxy-based thermal-release material (such as a Light-To-Heat-Conversion (LTHC) material), which is capable of being decomposed under radiation such as a laser beam, so that carrier 108 may be de-bonded from the overlying structures that will be formed in subsequent processes. In some embodiments, the release film 110 is applied on the carrier 108 through coating.

Figure 1D:
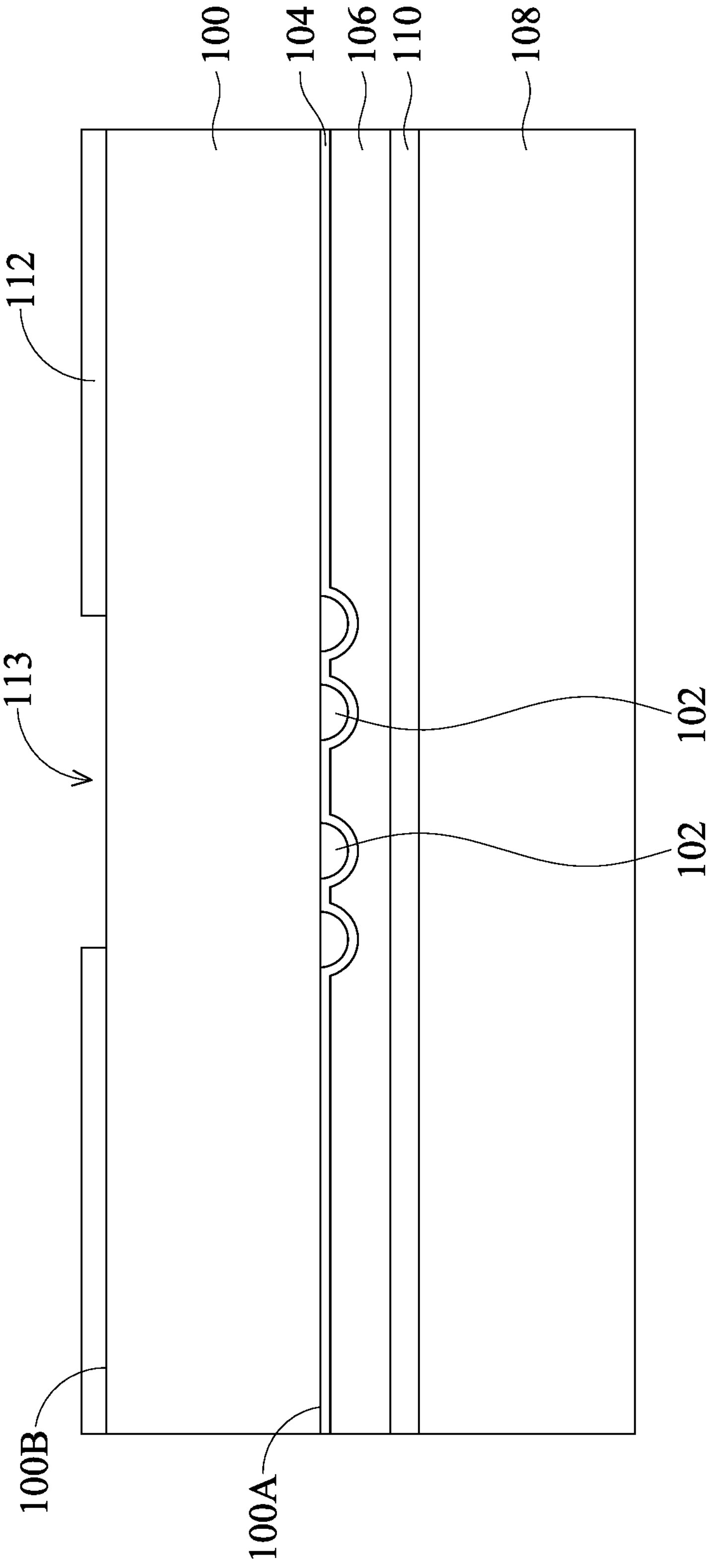

In FIG. 1D, a hard mask layer 112 (e.g., a nitride layer or the like) is formed over the substrate 100 (e.g., on the bottom surface 100B, the upper surface shown, of the substrate 100) and patterned, in accordance with some embodiment. The hard mask layer 112 may be formed using any acceptable process, such as CVD, PECVD, low pressure chemical vapor deposition (LPCVD), PVD, or other suitable deposition processes, and may be patterned using acceptable photolithography and etching techniques (e.g., anisotropic dry etching processes). The patterned hard mask layer 112 has an opening 113 to expose a portion of the underlying substrate 100, in some embodiments. Although not shown, the opening 113 may have a rectangular shape in a top view.

Figure 1E:
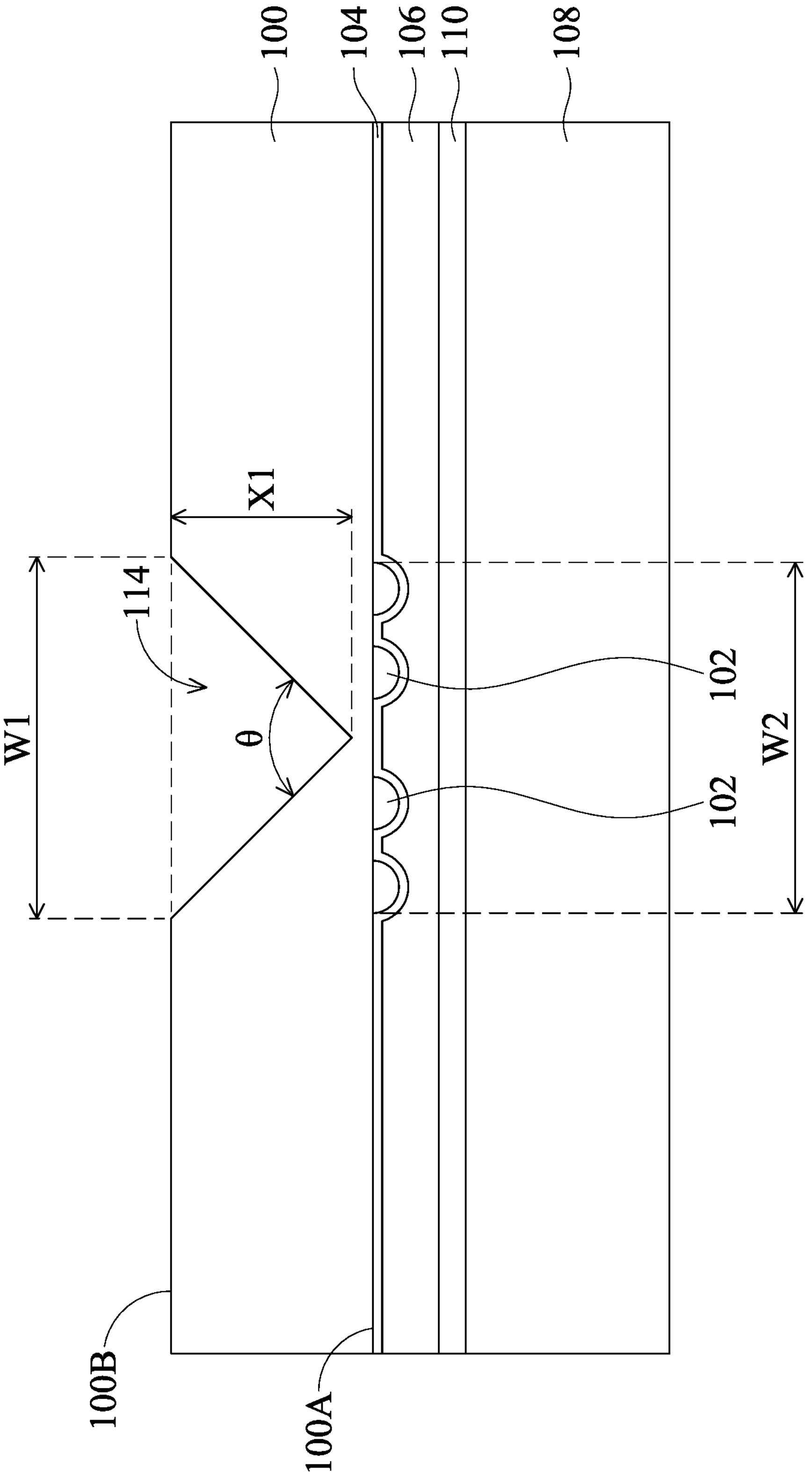

In FIG. 1E, a V-shaped groove 114 is formed within the substrate 100, in accordance with some embodiments. The V-shaped groove 114 may be formed by an etching process (e.g., an anisotropic wet etching process) using the patterned hard mask layer 112 as an etching mask. In some embodiments, the V-shaped groove 114 has a suitable (maximum) width W1 (e.g., the distance between the two sidewalls of the V-shaped groove 114 at the bottom surface 100B of the substrate 100) that is greater than the width W2 between the outermost edges of the outermost opposing micro lenses 102. This enables the inclined second side wall 200C (e.g., see FIG. 2) of the optical component 20 to have a sufficient height H1, which will be explained further later. Additionally, the V-shaped groove 114 may have a suitable (maximum) depth X1 (e.g., the distance from the bottom surface 100B of the substrate 100B to the tip of the V-shaped groove 114) and a suitable angle θ (e.g., between about 60 degrees and about 120 degrees) formed between the two sidewalls of the V-shaped groove 114, depending on the design requirements (which will be explained further later). The depth X1 and angle θ can be controlled, for example, by adjusting the etching time or other etching recipes. In some embodiments, after the V-shaped groove 114 is formed, the hard mask layer 112 is removed using an ashing process or other suitable etching processes.

Figure 1F:
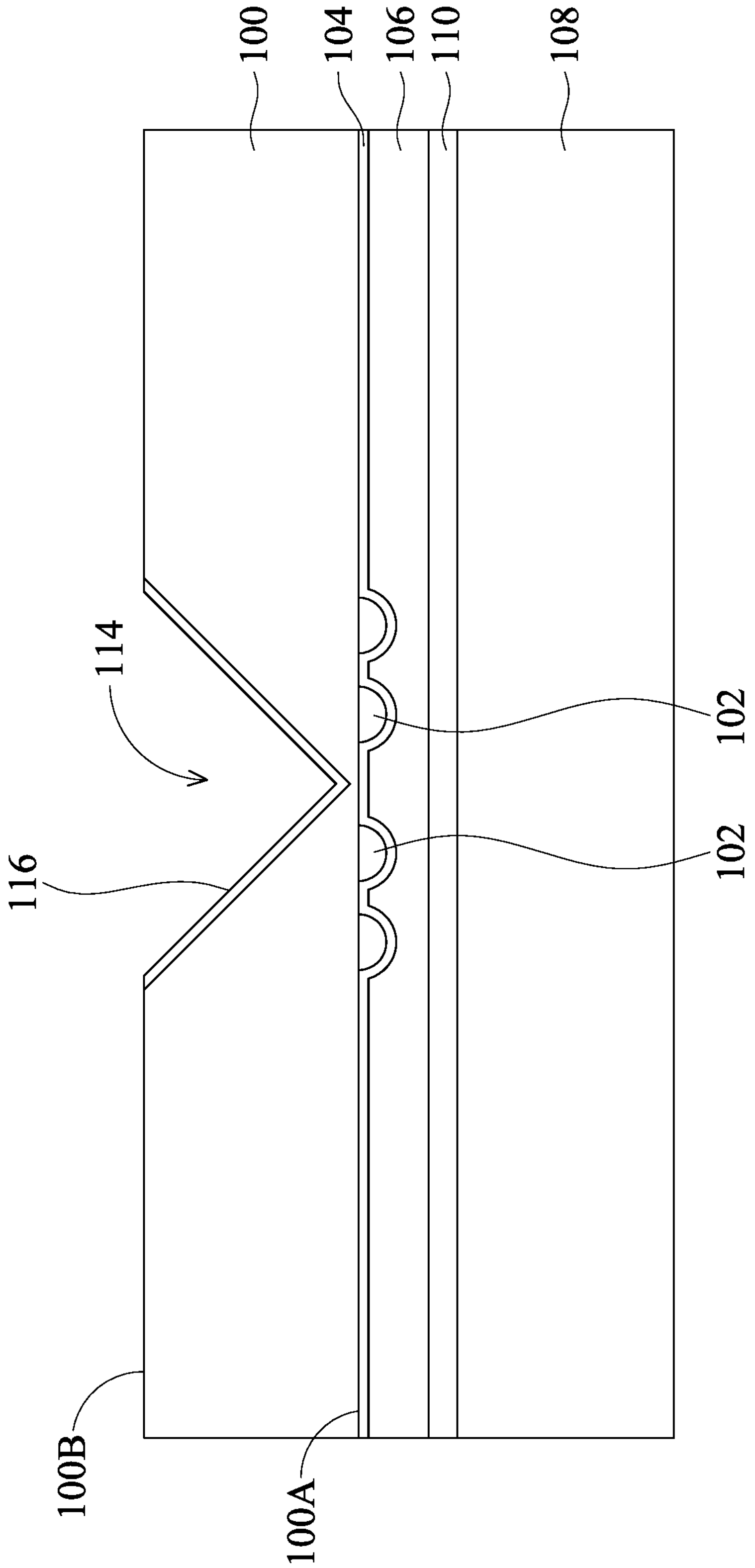

In FIG. 1F, a (light) reflective coating 116 is conformally formed on the surfaces of the two sidewalls of the V-shaped groove 114, in accordance with some embodiments. The reflective coating 116 helps redirect light within the optical component 20 (for example, directing light to exit the light emergent surface of the silicon-based body 200). In some embodiments, the reflective coating 116 may be a single-layered metal, and the metal material of the reflective coating 116 comprises gold (Au), silver (Ag), copper (Cu), aluminum (Al), titanium (Ti), tantalum (Ta), the like, the alloy thereof, or a combination thereof. Alternatively, the reflective coating 116 may be a multi-layered structure including multiple sub-layers, each sub-layer being formed from the above metal materials or other suitable dielectric materials (e.g., silicon oxide ($SiO_2$), hafnium oxide ($HfO_2$), tantalum oxide ($Ta_2O_5$), titanium oxide ($TiO_2$), silicon nitride (SiN), amorphous silicon, etc.). The reflective coating 116 may be formed using any acceptable process, such as CVD, PVD, ALD, or other suitable deposition processes. The thickness of the reflective coating 116 may be in a range between about 100 Å and about 100 μm, in some embodiments. Other thicknesses may be used in other embodiments.

In some embodiments, a mask layer (not shown) may be formed on the bottom surface 100B of the substrate 100 to prevent the reflective coating 116 from being formed on the bottom surface 100B, while exposing the V-shaped groove 114 so that the reflective coating 116 may be formed only on the surfaces of V-shaped groove 114. The mask layer is removed after the reflective coating 116 is formed.

Figure 1G:
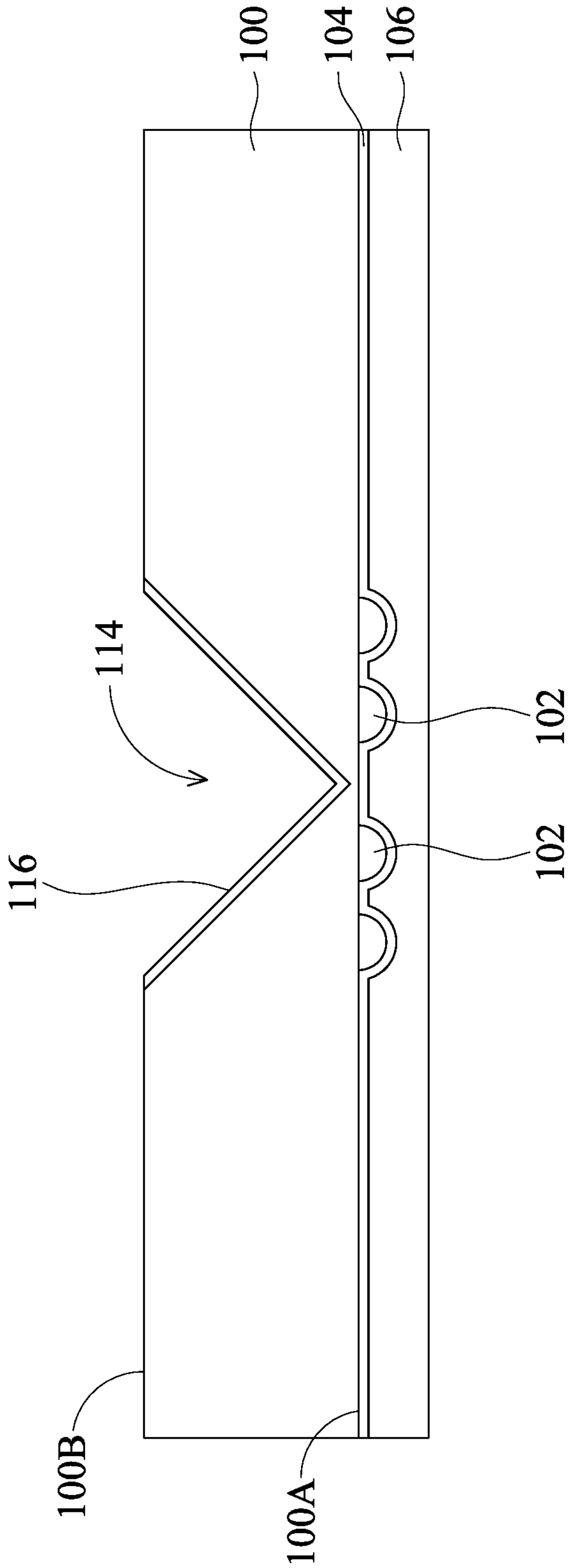

In FIG. 1G, the carrier 108 is removed from the overlying structure, in accordance with some embodiments. The carrier 108 may be removed from the overlying structure, for example, by projecting ultraviolet (UV) light or a laser beam, which penetrates through the carrier 108, on the release film 110. The release film 110 decomposes under the heat of the UV light or the laser beam. The carrier 108 may then be de-boned from the overlying structure, leaving the structure as shown in FIG. 1G.

Figure 1H:
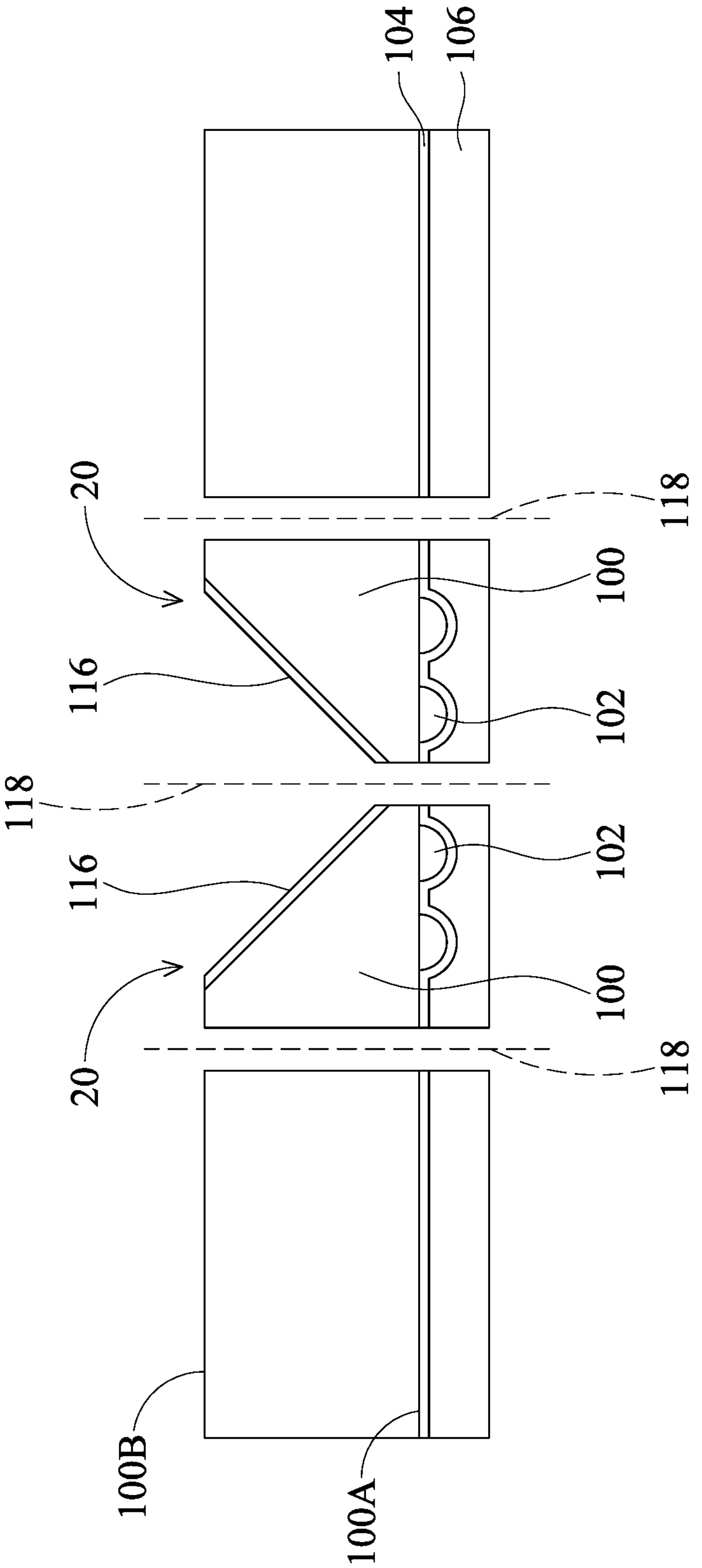

In FIG. 1H, a singulation process (e.g., a dicing process) is performed along lines 118 to produce a plurality of individual (e.g., separate) silicon-based optical components 20. The dicing process may be performed using a blade, or a laser cutting tool. Other acceptable singulation process may be used in other embodiments. Although only two optical components 20 are shown in FIG. 1H, skilled artisan will appreciate that tens, hundreds, or more identical optical components 20 may be formed at the same time through the above-mentioned method illustrated in FIGS. 1A to 1H.

FIG. 2 illustrates a cross-sectional view of a silicon-based optical component 20 formed using the semiconductor manufacturing method shown in FIGS. 1A to 1H, in accordance with some embodiments. In some cases, the optical component 20 may be integrated into a semiconductor package 600 (e.g., see FIG. 6) to help guide light from optical fibers 642 in a fiber unit array (FAU) 640 into a photonic package 620, which will be described later. When in use, the optical component 20 is both a mirror and a lens.

In some embodiments, the optical component 20 includes a silicon-based body 200. The term "silicon-based body" used herein represents that it is entirely formed of homogeneous silicon material. In some embodiments, the silicon-based body 200 includes a bottom wall 200A, a first side wall 200B, and a second side wall 200C. The first side wall 200B is located on the first side (e.g., the right side shown) of the silicon-based body 200, and is perpendicular to the bottom wall 200A. The second side wall 200C is located on the second side (e.g., the left side shown) of the silicon-based body 200 opposite to the first side, and is inclined relative to the bottom wall 200A. For example, the second side wall 200C forms an acute angle $\alpha$ with the bottom wall 200A, for example, in a range between 30 degrees and 60 degrees (e.g., 30 degrees, 42.5 degrees, 45 degrees, or 60 degrees), depending on the design requirements (e.g., determined by the position of the optical fibers 642), in some embodiments. In some cases, the optical component 20 is assembled in the semiconductor package 600 (e.g., see FIG. 6) such that the first side wall 200B faces the optical fibers 642 and the bottom wall 200A faces the photonic package 620.

Figure 3:
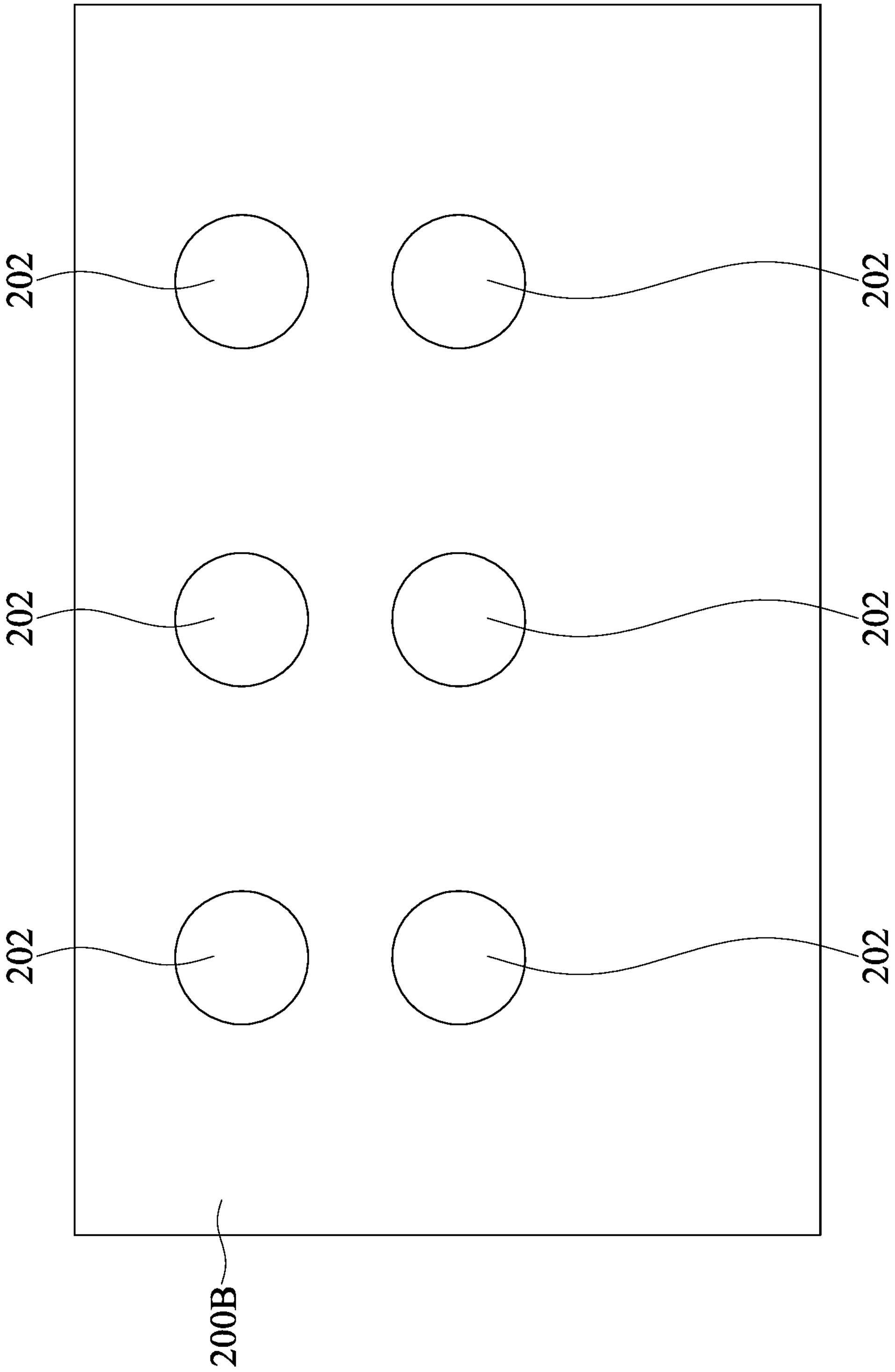
FIG. 3 illustrates a side view of a silicon-based optical component, showing the configuration of the micro lens structure, in accordance with some embodiments.

A micro lens structure ML including a plurality of micro lenses 202 are formed on (e.g., protrudes from) the first side wall 200B, in accordance with some embodiments. The micro lens structure ML is configured to focus and collimate the light from the optical fibers 642 (e.g., see FIG. 6), so that the optical component 20 acts as a lens. In this manner, the arrangement of the micro lenses 202 may correspond to the arrangement of the optical fibers 642. For example, when viewed from a direction D1 perpendicular to the first side wall 200B, the micro lenses 202 may be arranged in an array of multiple rows and columns (e.g., two rows and three columns), corresponding to the arrangement (not shown) of the optical fibers 642, as shown in FIG. 3 (some layers covering the first side wall 200B are not shown in this figure for clarity), in some embodiments. Other arrangement of the micro lenses 202 may be used in other embodiments. For example, the micro lenses 202 may also be arranged in a one-dimensional array, corresponding to the arrangement of the optical fibers 642, in some embodiments.

In some embodiments, each micro lens 202 is spherical and has a radius of curvature (ROC) between about 80 μm and about 300 μm, depending on the design requirements (e.g., determined by the size of the optical fibers 642). For example, the larger the size of the optical fibers 642, the larger the ROC of the micro lenses 202, and vice versa. In some embodiments, the pitch P1 of the micro lenses 202 may be in a range between about 120 μm and about 500 μm, which is also determined by the arrangement of the optical fibers 642. For example, the larger the pitch of the optical fibers 642, the larger the pitch P1 of the micro lenses 202, and vice versa.

In some embodiments, the inclined second side wall 200C has a sufficient height H1 (e.g., between about 100 μm and about 500 μm) in a direction D2 parallel to the first side wall 200B, which is at least greater than the height H2 of the micro lens structure ML in the direction D2 (in cases where the micro lens structure ML includes a plurality of micro lenses 202 arranged in the direction D2, the height H2 is measured between the outermost edges of the outermost opposing micro lenses 202, as shown in FIG. 2). This facilitates that all light passing through the micro lenses 202 can be focused on the second side wall 200C and then reflected.

In some embodiments, the silicon-based body 200 (e.g., including the bottom wall 200A, the first side wall 200B, the micro lens structure ML, and the second side wall 200C) is integrally formed, for example, by the semiconductor manufacturing method shown in FIGS. 1A to 1H. Since the silicon-based body 200 is formed from the substrate 100 (e.g., shown in FIG. 1A), the silicon-based body 200 may have a width W3 (e.g., the sum of the width of the bottom wall 200A and the thickness of the micro lens structure ML) of about 770 μm, which corresponds to the thickness T1 of the substrate 100 (e.g., a silicon wafer).

In some embodiments, the silicon-based body 200 further includes a top wall 200D connecting the first side wall 200B and the second side wall 200C, and a third side wall 200E connecting the bottom wall 200A and the second side wall 200C, as shown in FIG. 2. The top wall 200D may be parallel to the bottom wall 200A, and the third side wall 200E may be parallel to the first side wall 200B. The presence of the top wall 200D and third side wall 200E helps to improve the structural strength of the silicon-based body 200.

The optical component 20 further includes a protection layer 206 (corresponding to the oxide layer 106 shown in FIG. 1B) formed over the first side wall 200B and the micro lens structure ML to protect them, in accordance with some embodiments. The protection layer 206 may be formed of or comprise a dielectric material, such as an oxide (e.g., silicon oxide or the like) or another suitable dielectric material (e.g., SiON, SiN). In some embodiments, the protection layer 206 may be a material (e.g., silicon oxide) that is substantially transparent to the light from the optical fibers 642. As mentioned above, due to the difference in refractive indices of the materials of the protection layer 206 and silicon-based body 200, the protection layer 206 also helps refract light into the silicon-based body 200 to improve the optical coupling efficiency of the optical component 20. The thickness T3 of the protection layer 206 may be in a range between about 3 μm and about 5 μm, in some embodiments. Other thicknesses may be used in other embodiments.

Since the singulation process (e.g., dicing process, as shown in FIG. 1H) cuts the substrate 100 and the oxide layer 106 at the same time, the first side surface (e.g., the upper surface shown) of the protection layer 206 may be flush with the top wall 200D of the silicon-based body 200, and the second side surface (e.g., the lower surface shown) of the protection layer 206 may be flush with the bottom wall 200A of the silicon-based body 200, in some embodiments. Additionally, the top surface (the rightmost surface shown) of the protection layer 206 is planar (due to the planarization process illustrated in FIG. 1B) and substantially parallel to the first side wall 200B in some embodiment, which also helps reduce light loss (i.e., improves light coupling efficiency).

The optical component 20 also includes an anti-reflection coating (ARC) 204 (corresponding to the ARC 104 shown in FIG. 1B) formed at the interface between the first side wall 200B (and the micro lens structure ML) of the silicon-based body 20 and the protection layer 206, in accordance with some embodiments. As mentioned above, the anti-reflection coating 204 helps reduce the light reflection occurring on the light incident surface (i.e., the first side wall 200B including the micro lens structure ML) of the silicon-based body 200, so as to improve the optical coupling efficiency of the optical component 20. The materials and configuration of the anti-reflection coating 204 may be the same as those of the anti-reflection coating 104 illustrated in FIG. 1B, and are not repeated here. The thickness of the anti-reflection coating 204 may be in a range between about 500 nm and about 1800 nm. Other thicknesses may be used in other embodiments.

The optical component 20 also includes a (light) reflective coating 216 (corresponding to the reflective coating 116 shown in FIG. 1F) formed over the inclined second side wall 200C, in accordance with some embodiments. As mentioned above, the reflective coating 216 helps redirect light within the optical component 20, for example, directing light to exit the light emergent surface (i.e., the bottom wall 200A) of the silicon-based body 200, so that the optical component 20 also acts as a mirror. The materials and configuration of the reflective coating 216 may be the same as those of the reflective coating 116 illustrated in FIG. 1F, and are not repeated here. The thickness of the reflective coating 216 may be in a range between about 100 Å and about 100 μm, in some embodiments. Other thicknesses may be used in other embodiments.

Through the above structural design, the optical component 20 acts as both a mirror and a lens. For example, light (e.g., from the optical fibers 642, as shown in FIG. 6) can pass through the protection layer 206, the anti-reflection coating 204, and the first side wall 200B of the silicon-based body 200, and then be focused on the inclined second side wall 200C by the micro lens 202 on the first side wall 200B, and then be reflected by the reflective coating 216 over the inclined second side wall 200C, and finally exit the silicon-based body 200 from the bottom wall 200A (please refer to the path LP shown in FIG. 6 for this light travel path).

Figure 4:
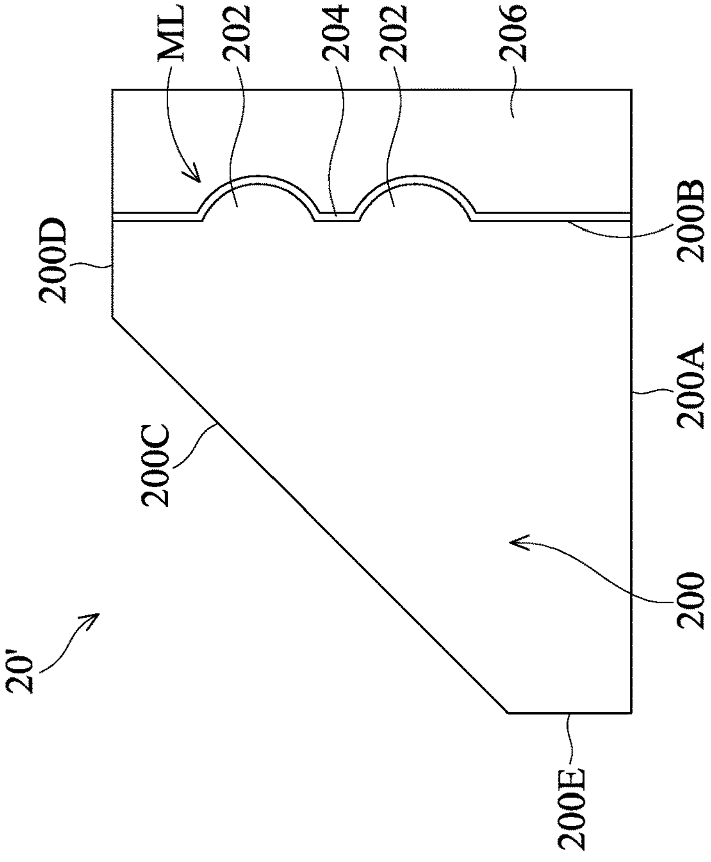
FIG. 4 illustrates a cross-sectional view of a silicon-based optical component, in accordance with some embodiments.

FIG. 4 illustrates a cross-sectional view of a silicon-based optical component 20', in accordance with some embodiments. The silicon-based optical component 20' is similar to the optical component 20 of FIG. 2, except that the reflective coating 216 is omitted, and the inclined second side wall 200C is exposed (e.g., exposed to air layers). Since the material of the silicon-based body 200 has a different refractive index from that of air, the silicon-based body 200 has a high internal reflection, so that light can still be reflected by the inclined second side wall 200C. In other words, the silicon-based optical component 20' still functions as a mirror and a lens.

Figure 5:
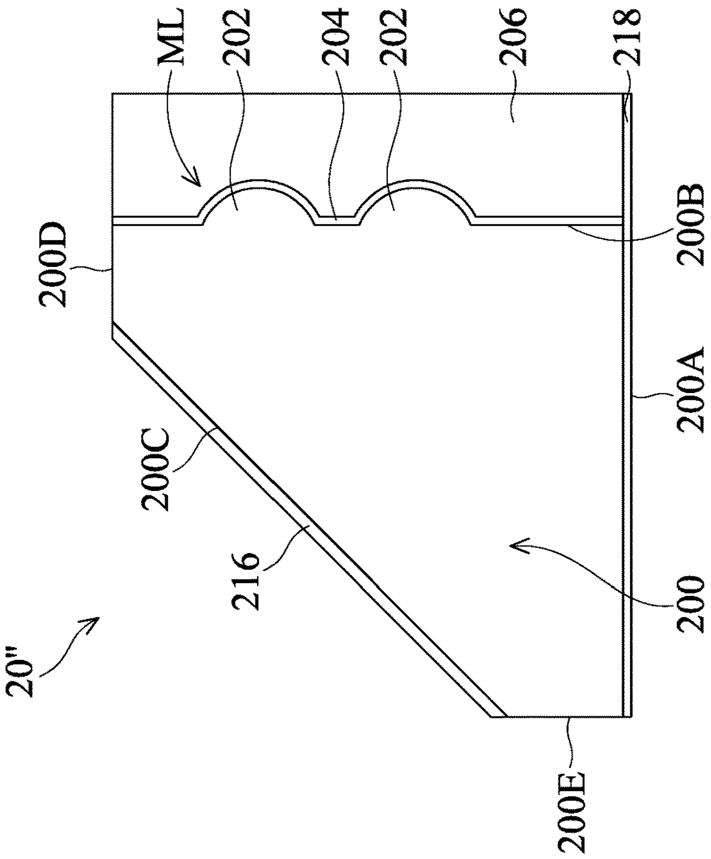
FIG. 5 illustrates a cross-sectional view of a silicon-based optical component, in accordance with some embodiments.

FIG. 5 illustrates a cross-sectional view of a silicon-based optical component 20", in accordance with some embodiments. The silicon-based optical component 20" is similar to the optical component 20 of FIG. 2, except that an additional anti-reflection coating (ARC) 218 is formed over the bottom wall 200A of the silicon-based body 200. The presence of the anti-reflection coating 218 helps to reduce the light reflection occurring on the light emergent surface (i.e., the bottom wall 200A) of the optical component 20", thereby increasing the light output of the optical component 20".

Figure 6:
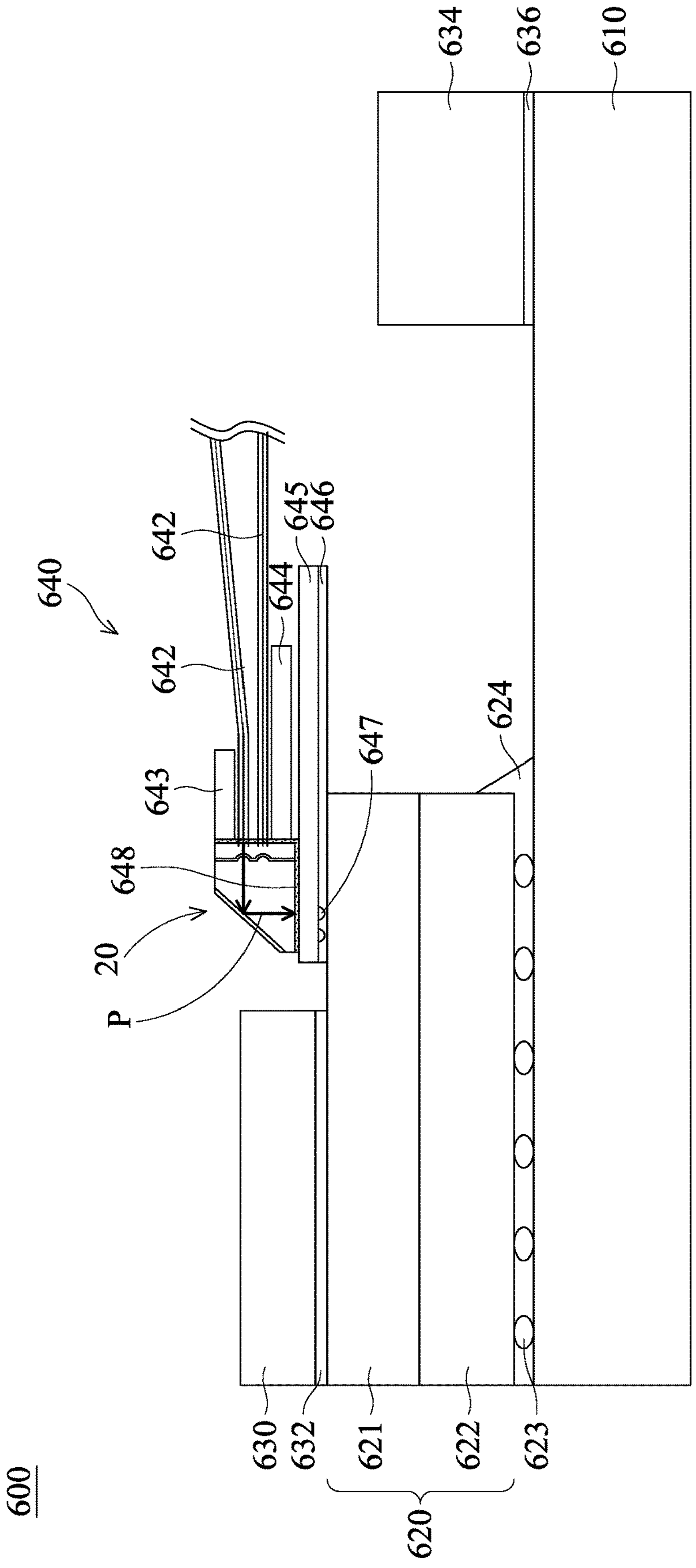
FIG. 6 illustrates a cross-sectional view of a portion of a semiconductor package, in accordance with some embodiments.

FIG. 6 illustrates a cross-sectional view of a portion of a semiconductor package 600 (e.g., only the right half of the package is shown), in accordance with some embodiments. The semiconductor package 600 includes an optical component 20 (e.g., the optical component 20 shown in FIG. 2) that couples optical signals from a fiber unit array (FAU) 640 to a photonic package 620. Assembly of the optical component 20 and the FAU 640 within the semiconductor package 600 will be described later.

The semiconductor package 600 may include a package substrate 610, which is used to provide electrical connection between semiconductor devices packaged in the semiconductor package 600 and an external electronic device (not shown). In some embodiments, the package substrate 610 is a printed circuit board (PCB), which may be a core or core-less substrate. Details of a PCB are not illustrated herein. Although not shown, electrical connectors may be formed on the bottom of the package substrate 610 to enable electrical connection between the semiconductor package 600 and an external electronic device. In other embodiments, another suitable package substrate may be used. Various device elements (not shown), such as active or passive devices (e.g., transistors, diodes, resistors, capacitors, inductors, etc.), may also be formed in or on the package substrate 610, in some embodiments.

The semiconductor package 600 includes a photonic package 620 attached to the package substrate 610, in accordance with some embodiments. The photonic package 620 includes an electronic die 621 attached (e.g., bonded) to a photonic die 622. For simplicity, details of the electronic die 621 and photonic die 622 are not shown in the figure. The electronic die 621 may be, for example, a semiconductor device, die, or chip that communicates with the photonic die 622 using electrical signals. The electronic die 621 does not receive, transmit, or process optical signals. In the discussion herein, the term “electronic die” is used to distinguish from “photonic die” (e.g., 622), which refers to a die that can receive, transmit, or process optical signals, such as converting an optical signal into an electric signal, or vice versa. Besides optical signals, the photonic die 622 may also transmit, receive, or process electrical signals.

In some embodiments, the electronic die 621 may include a substrate (e.g., a semiconductor substrate, such as silicon or the like), electronic components (e.g., transistors, diodes, capacitors, resistors, etc.) formed in and/or on the substrate, and a redistribution structure (e.g., an interconnect structure) formed over the substrate for interconnecting the electronic components to form an integrated circuit. In some embodiments, the integrated circuit may comprise controllers, drivers, transimpedance amplifiers, the like, or a combination thereof, for controlling the operation of the photonic components of the photonic die 622. In some embodiments, the electronic die 621 provides Serializer/Deserializer (SerDes) functionality. In this manner, the electronic die 621 may act as part of an I/O interface between optical signals and electrical signals within the photonic package 620. In some embodiments, the photonic die 622 may include a substrate (e.g., a buried oxide ("BOX") substrate), photonic components (e.g., photodetectors, modulators, etc.), waveguides, grating couplers and/or other photonic structures formed in and/or on the substrate, and a redistribution structure (e.g., an interconnect structure) formed over the substrate and electrically connected to the photonic components. The photonic components, waveguides, and grating couplers may be optically coupled to form a "photonic integrated circuit (PIC)" for receiving, transmitting, or processing optical signals. The electronic die 621 may be bonded to the photonic die 622 by a suitable bonding process, such as by dielectric-to-dielectric bonding and/or metal-to-metal bonding (e.g., direct bonding, fusion bonding, oxide-to-oxide bonding, hybrid bonding, or the like), in some embodiments. Other further details about the photonic package 620 (i.e., electronic die 621 and photonic die 622) are not illustrated herein.

In some embodiments, the photonic package 620 may be attached to the package substrate 610 through flip-chip bonding. For example, the photonic package 620 is bonded onto the contact pads (not shown) exposed at the upper surface of the package substrate 610 via electrical connectors 623. The electrical connectors 623 may include conductive pillars, solder balls, controlled collapse chip connection (C4) bumps, micro bumps, one or more other suitable bonding structures, or a combination thereof. An underfill layer 624 may be formed in the gap between the photonic package 620 and the package substrate 610 to surround and protect the electrical connectors 623 and enhance the connection between the photonic package 620 and the package substrate 610, in some embodiments.

A heat spreader 630 (e.g., a metal lid) may be attached to the photonic package 620 to help dissipate heat, in some embodiments. The heat spreader 630 may be attached to the photonic package 620 via thermal interface material (TIM) 632. In some embodiments, the heat spreader 630 covers a portion of the top of the photonic package 620, while exposing another portion for coupling the FAU 640 and optical component 20, as shown in FIG. 6. In some embodiments, a stiffener ring 634 (e.g., a metal ring) may be disposed along the periphery of the package substrate 610 to reduce warpage. The stiffener ring 634 may be attached to the top surface of the package substrate 610 via adhesive 636.

In some embodiments, the FAU 640 may include a plurality of optical fibers 642 inserted between an upper cover 643 and a lower cover 644. The upper cover 643 and/or the lower cover 644 may include U-shaped or V-shaped grooves (not shown) for securing the optical fibers 642 in place. The optical fibers 642 of the FAU 640 may be arranged in a one-dimensional or two-dimensional array.

In some embodiments, a connection board (e.g., a silicon substrate) 645 is provided to support the FAU 640 and optical component 20 and couple (e.g., optically and physically couple) the FAU 640 and optical component 20 with the photonic package 620. The FAU 640 and the optical component 20 may be placed on the same side (e.g., upper surface) of the connection board 645. For example, the optical component 20 is placed over the connection board 645 with the protection layer 206 (see FIG. 2) facing the FAU 640 and the bottom surface 200A of the silicon-based body 200 (see FIG. 2) facing the upper surface of the connection board 645, as shown in FIG. 6.

In some embodiments, the FAU 640 is attached to the connection board 645 via an adhesive (not shown), and the optical component 20 is attached to the connection board 645 via an optical glue 648. An optical glue 646 is also applied to the lower surface of the connection board 645 for connecting the connection board 645 to the photonic package 620. One or more micro lenses 647 may be formed on (e.g., attached to) the lower surface of the connection board 645 and directly below the optical component 20, in some embodiments.

Through the above structural design, the light from the FAU 640 can be directed toward the connection board 645 by the optical component 20 (as indicated by the path LP shown in FIG. 6), and then pass through the connection board 645, and then be directed by the micro lenses 647 to the photonic components (not shown) of the photonic die 622 of the photonic package 620 (the optical travel path outside the optical component 20 is not shown). In other embodiments, the optical component 20' of FIG. 4 or optical component 20" of FIG. 5 can also be applied to the semiconductor package 600.

It should be understood that the materials, configurations and the manufacturing methods described herein are only illustrative, and are not intended to be, and should not be constructed to be, limiting to the present disclosure. Many alternatives and modifications will be apparent to those skilled in the art, once informed by the present disclosure.

Embodiments of the present disclosure may achieve advantages. The disclosed silicon-based optical component acts as both a mirror and a lens, and can be formed from a silicon wafer using semiconductor manufacturing techniques. Therefore, optical components of smaller-size and higher precision can be obtained, and manufacturing costs can be reduced, compared with traditional glass mirror lenses. In some embodiments, the silicon-based optical component can be integrated within the semiconductor package to help guide light from optical fibers into the photonic package.

In accordance with some embodiments, an optical component is provided. The optical component includes a silicon-based body including a bottom wall, a first side wall, a second side wall, and a micro lens structure. The first side wall is located on a first side of the silicon-based body and perpendicular to the bottom wall. The second side wall is located on a second side of the silicon-based body opposite to the first side, and forms an acute angle with the bottom wall. The micro lens structure is formed on the first side wall. The optical component further includes a protection layer formed over the first side wall and the micro lens structure.

In accordance with some embodiments, a method of forming an optical component is provided. The method includes patterning a first surface of a silicon substrate to form a micro lens structure on the first surface. The method includes forming a light transmissive dielectric layer over the first surface and the micro lens structure. The method includes attaching the light transmissive dielectric layer to a carrier. The method includes patterning a second surface of the silicon substrate opposite to the first surface to form a V-shaped groove within the silicon substrate. The method includes removing the carrier. The method further includes performing a singulation process to cut the silicon substrate and the light transmissive dielectric layer to produce a plurality of optical components.

In accordance with some embodiments, an optical component is provided. The optical component includes a silicon-based body including a bottom wall, a first side wall, a second side wall, and a micro lens structure. The first side wall is located on a first side of the silicon-based body and perpendicular to the bottom wall. The second side wall is located on a second side of the silicon-based body opposite to the first side, and forms an acute angle with the bottom wall. The micro lens structure is formed on the first side wall. The optical component further includes a dielectric layer formed over the first side wall and the micro lens structure, wherein the micro lens structure is embedded within the dielectric layer. The dielectric layer has a planar surface that is parallel to the first side wall.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical component, comprising:
- a silicon-based body, comprising:
  - a bottom wall;
  - a first side wall located on a first side of the silicon-based body and perpendicular to the bottom wall;
  - a second side wall located on a second side of the silicon-based body opposite to the first side and forming an acute angle with the bottom wall; and
  - a micro lens structure formed on the first side wall; and
- a protection layer formed over the first side wall and the micro lens structure,
- wherein in a direction parallel to the first side wall, a width of the protection layer is equal to a width of the first side wall.

2. The optical component as claimed in claim 1, wherein the protection layer is an oxide layer.

3. The optical component as claimed in claim 1, wherein the silicon-based body is integrally formed as one piece.

4. The optical component as claimed in claim 1, wherein the acute angle between the second side wall and the bottom wall is in a range between 30 degrees and 60 degrees.

5. The optical component as claimed in claim 1, wherein the micro lens structure comprises a plurality of micro lenses arranged in the direction parallel to the first side wall, and a height of the second side wall in the direction is greater than a total height of the micro lens in the direction.

6. The optical component as claimed in claim 1, wherein the micro lens structure comprises a plurality of micro lenses arranged in an array of multiple rows and columns when viewed from a direction perpendicular to the first side wall.

7. The optical component as claimed in claim 1, further comprising an anti-reflection coating formed at an interface between the first side wall and the micro lens structure of the silicon-based body and the protection layer, wherein in the direction parallel to the first side wall, a width of the anti-reflection coating is equal to the width of the first side wall, and equal to the width of the protection layer.

8. The optical component as claimed in claim 7, further comprising a light reflective coating formed over the second side wall.

9. The optical component as claimed in claim 7, further comprising a second anti-reflection coating formed over the bottom wall.

10. The optical component as claimed in claim 1, wherein a sum of a width of the bottom wall and a thickness of the micro lens structure in a direction parallel to the bottom wall is about 770 μm.

11. An optical component, comprising:
- a silicon-based body, comprising:
  - a bottom wall;
  - a first side wall located on a first side of the silicon-based body and perpendicular to the bottom wall;
  - a second side wall located on a second side of the silicon-based body opposite to the first side and forming an acute angle with the bottom wall;
  - a top wall connecting the first side wall and the second side wall, wherein the top wall is parallel to the bottom wall; and
  - a micro lens structure formed on the first side wall; and
- a dielectric layer formed over the first side wall and the micro lens structure, wherein the micro lens structure is embedded within the dielectric layer, and the dielectric layer has a planar surface that is parallel to the first side wall, and
- wherein the dielectric layer further has a first side surface and a second side surface located on opposite sides of the planar surface, the first side surface is flush with the top wall of the silicon-based body, and the second side surface is flush with the bottom wall of the silicon-based body.

12. The optical component as claimed in claim 11, wherein the silicon-based body further comprises:
- a third side wall connecting the bottom wall and the second side wall, wherein the third side wall is parallel to the first side wall.

13. The optical component as claimed in claim 11, further comprising:
- an anti-reflection coating formed at an interface between the first side wall and the micro lens structure of the silicon-based body and the dielectric layer; and
- a light reflective coating formed over the second side wall.

14. An optical component, comprising:
- a silicon-based body, comprising:
  - a bottom wall;
  - a top wall opposite to the bottom wall;
  - a first side wall located on a first side of the silicon-based body and perpendicular to the bottom wall and the top wall, wherein the first side wall connects the top wall and the bottom wall;
  - a second side wall located on a second side of the silicon-based body opposite to the first side and forming an acute angle with the bottom wall; and
  - a micro lens structure formed on the first side wall; and
- a protection layer formed over the first side wall and the micro lens structure,
- wherein in a direction parallel to the first side wall, a width of the protection layer is equal to a width of the first side wall.

15. The optical component as claimed in claim 14, wherein the top wall is parallel to the bottom wall.

16. The optical component as claimed in claim 15, wherein the top wall connects the first side wall and the second side wall.

17. The optical component as claimed in claim 14, further comprising a third side wall connecting the bottom wall and the second side wall, wherein the third side wall is parallel to the first side wall.

18. The optical component as claimed in claim 14, further comprising a light reflective coating formed over the second side wall.

19. The optical component as claimed in claim 14, wherein the micro lens structure comprises a plurality of micro lenses protruding from the first side wall, and each micro lens of the plurality of micro lenses has a radius of curvature between about 80 μm and about 300 μm.

20. The optical component as claimed in claim 14, wherein the first side wall has an upper edge and a lower edge, with the upper edge contacting the top wall and the lower edge contacting the bottom wall, and wherein in the direction parallel to the first side wall, a distance between the upper edge and the lower edge is equal to the width of the protection layer.

* * * * *